United States Patent

[11] 3,529,591

[72] Inventor William H. Schuette
    McLean, Virginia
[21] Appl. No. 729,640
[22] Filed May 16, 1968
[45] Patented Sept. 22, 1970
[73] Assignee Biotronex Laboratory, Incorporated
    Silver Spring, Maryland
    a corporation of Maryland

[54] CATHETER TIP BLOOD VELOCITY SENSOR
    16 Claims, 4 Drawing Figs.
[52] U.S. Cl. .................................................. 128/2.05,
                                                                73/194
[51] Int. Cl. .................................................. A61b 5/05
[50] Field of Search .......................................... 128/2.05;
                                                        73/194EM, 194M

[56] References Cited
    UNITED STATES PATENTS
2,691,303 10/1954 De Boisblanc............... 73/194
3,330,269 7/1967 Pieper......................... 128/2.05
3,347,224 10/1967 Adams....................... 128/2.05

Primary Examiner—Richard A. Gaudet
Assistant Examiner—G. F. Dunne
Attorney—Mason, Fenwick and Lawrence ABSTRACT: A catheter tip blood velocity sensor having an axially wound magnetic coil with a pair of aligned electrodes mounted forwardly of the coil within the confines of an axially extending tubular shield having a forward opening and a rearward opening through which blood flow respectively enters and exits the tube to flow past the electrodes to create an electromotive force across the electrodes indicative of flow velocity.

Patented Sept. 22, 1970
3,529,591
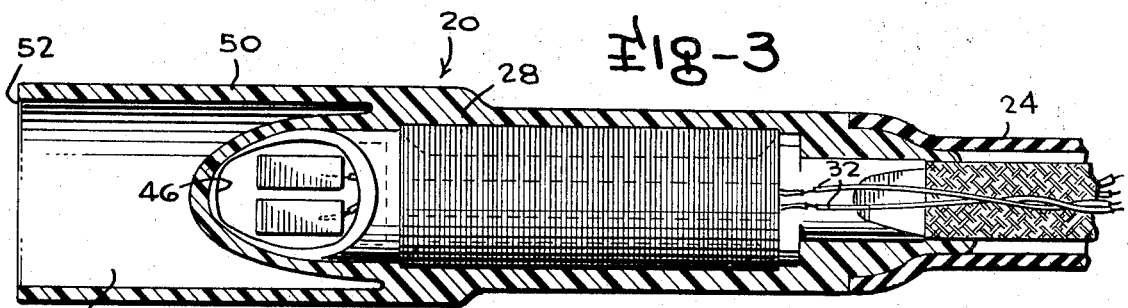
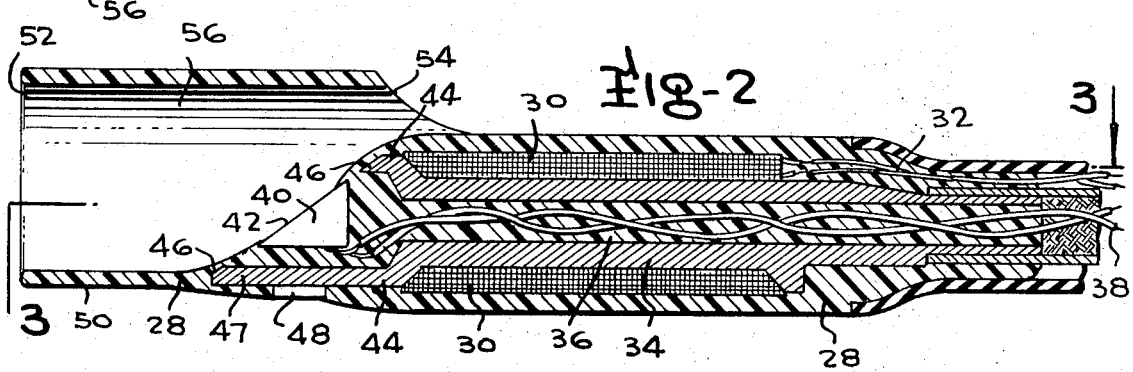
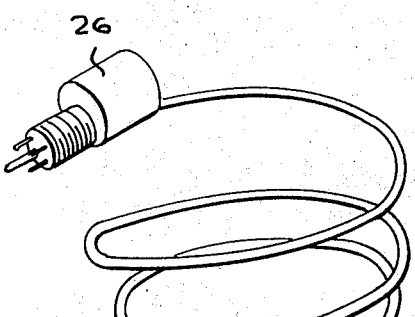
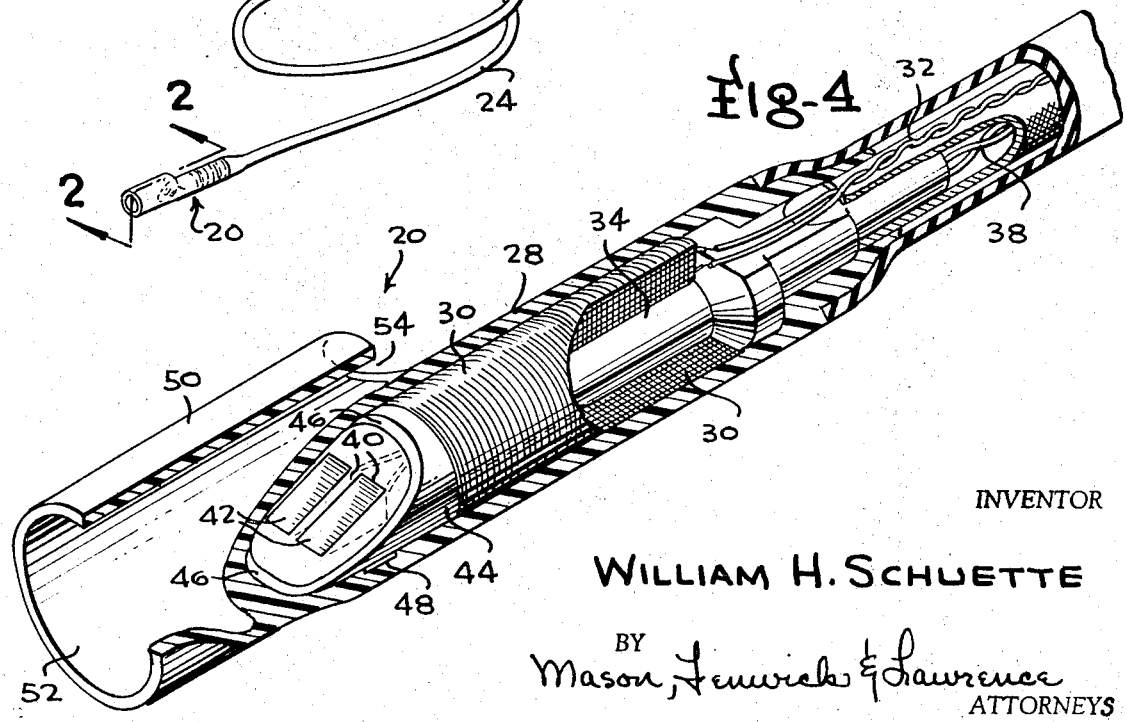
INVENTOR
WILLIAM H. SCHUETTE
BY Mason, Fenwick & Lawrence
ATTORNEYS

CATHETER TIP BLOOD VELOCITY SENSOR

BACKGROUND OF THE INVENTION

This invention is related to the field of flowmeters and is specifically directed to an electromagnetic catheter tip flowmeter that is insertable into a blood vessel for measuring blood velocity through the vessel.

Medical science has, for a variety of reasons, long sought accurate and safe means for determining blood velocity through major arteries and veins. Consequently, numerous devices have been proposed for this purpose and have functioned with various degrees of success. For example, thermal devices, pressure gradient devices and ultrasonic devices have all been employed in an attempt to provide an accurate and reliable means for measuring velocity.

However, most of the activity in the field of blood flow measurement has been directed toward devices employing an electromagnetic coil for providing a magnetic field which generates an electromotive force across a pair of electrodes associated with the vessel through which flow is desired to be measured. While quite accurate results have been obtained with the employment of an externally located cuff type electromagnetic coil which encircles the vessel through which flow is being measured, such devices suffer from the serious drawback of requiring surgical exposure of the vessel to enable placement of the coil in adjacent relationship with the exterior wall of the vessel. Consequently, a variety of catheter tip probes which could be inserted into the vessel at any convenient location and threaded to a position where a flow reading was desired have evolved. The most common type of catheter tip flowmeter devices employ an insertable coil positionable on the interior of a blood vessel and supported within a solid cylindrical core support having exteriorly mounted electrodes on the cylindrical surface for sensing the electromotive force caused by flow through the magnetic field. Unfortunately, devices of this sort have not proven to be entirely satisfactory in that they are highly susceptible to the influence of other parameters. A particularly acute problem with devices of this sort is that the voltage output from the electrodes varies considerably when the electrodes come into contact with the wall of the vessel in which the device is being employed. Unfortunately, it is impossible to determine whether or not the electrodes are actually in contact with the wall of the vessel and the validity of the output signal is never completely assured.

Another difficulty with devices of this sort is that they are quite difficult to calibrate for a zero flow condition so as to obtain a base line of operation for such a flow condition.

Another form of previously employed catheter flowmeter employs a pair of electromagnetic coils spaced on opposite sides of a transverse opening in an elongated cylindrical support member through which flow occurs in a direction substantially perpendicular to the axis of the coil. Catheter flowmeters of this type are inserted in a main vessel such as the aorta and then moved to a position so that the opening in the flowmeter is placed adjacent a branching artery or vein. Consequently, flow into the branching vessel can usually be measurable with a satisfactory degree of accuracy. However, devices of this sort cannot provide a satisfactory indication of the flow through the main vessel in which the flowmeter is located. Therefore, devices of this character are of only limited application and do not meet the need for an accurate device for measuring flow in a main vessel. Moreover, devices of this sort are also difficult to correlate in order to obtain a base line indicative of the zero-flow condition.

Other insertable catheter tip type flowmeters have employed pressure transducers for moving a core element in response to the velocity pressure of flow against a diaphragm member connected to the coil element. Movement of the core element provides an output voltage from a coil surrounding the core element indicative of the velocity pressure of the fluid impinging upon the diaphragm. Devices of this sort are, of necessity, of substantial diameter and cannot be used in any vessel other than the largest veins and arteries. Consequently, their uses are quite limited. An example of a device of this sort is found in U.S. Pat. No. 3,038,465.

A variation of a last mentioned type of catheter tip flowmeter is found in U.S. Pat. No. 3,330,269 in which the core element is shifted by the drag of blood flow against a flow sensing element. This device has not fully met the needs of the medical profession in that it is quite complicated and is of substantial size so as to be useful only in the largest vessels.

Therefore, it is the primary object of this invention to provide a new and improved catheter type flowmeter. Moreover, it is also a specific object of this invention to provide a new and improved catheter type flowmeter of such small size as to enable use in the smaller arteries and veins.

Yet another object of this invention is the provision of a catheter type flowmeter which easily provides a zero-flow readout to enable the obtainment of a base line indicative of such a flow condition.

The objects of this invention are achieved by the provision of a catheter type flowmeter comprising an electromagnetic coil having its axis parallel to the axis of the catheter and having a hollow metal core extending through the coil and terminating forwardly of the coil with one side of the external termination of the core being extended further than the other side of the forward termination of the core. A pair of side-by-side electrodes are supported in an insulating medium adjacent the forward end of the core to have exposed surfaces engageable with fluid flowing past same. A tubular plastic shield having forward and rearward openings encircles the electrodes and extends forwardly to form the forward tip of the catheter. Blood flow passes through the tubular shield and flows directly past the exposed electrodes to exit through the rearward opening in the tubular shield. The forwardly extending portion of the core member shapes the electromagnetic field created by the coil so that the field is substantially perpendicular to the flow of blood past the electrodes to consequently provide an optimum output voltage. Moreover, the shield surrounding the electrodes confines the electric field seen by the electrodes so that there is a minimum of interference created during use of the probe by contacting the wall of the vessel in which the catheter is employed.

DESCRIPTION OF THE DRAWINGS

FIG. 1 is a perspective view of the preferred embodiment of this invention;

FIG. 2 is a sectional view taken along lines 2—2 of FIG. 1;

FIG. 3 is a sectional view taken along lines 3—3 of FIG. 2; and

FIG. 4 is a perspective view of the preferred embodiment with portions removed for purposes of illustrating the interior construction.

DESCRIPTION OF THE PREFERRED EMBODIMENT

The preferred embodiment of this invention is illustrated pictorially in FIG. 1 which illustrates the combinational relationship of the basic elements of the preferred embodiment. The invention is specifically directed to a catheter tip generally designated 20 which is connected to a catheter 24 which, in turn, is provided with an electrical connector 26 on its opposite end. Connector 26 is connected to any suitable electronic circuitry equipment for receiving and measuring signals from the tip assembly 20. Recording means for providing a record of flow signals received from tip 20 is usually employed with such equipment.

Tip assembly 20 includes an outer sheath 28 formed of plastic or other non-toxic material and connected at its rearward end to a conventional catheter 24. A cylindrical electromagnetic coil 30 is wound about a hollow tubular magnetic core 34 of high magnetic permeability having an axis parallel to the axis of the catheter tip as shown in FIGS. 2 and 3 of the drawings. Coil 30 is connected to a pair of power providing wires 32 and activation of coil 30 is enabled by the supplying of current through wires 32 so as to create an electromagnetic field in a well-known manner.

The hollow interior of core 34 is filled with a solidified epoxy or other plastic material forming a plastic core 36 and encasing a pair of electrode lead wires 38. A pair of electrodes 40 are respectively connected to wires 38 and are embedded in plastic core 36 so that only one flat outer surface 42 of each electrode is exposed as shown in FIG. 2 of the drawings.

Core 34 is formed with an enlarged diameter forward portion 44 as shown in FIGS. 2 and 4. The enlarged diameter portion 44 terminates on its forward end in an oval planar surface 46 resultant from a slanted diagonal cutting of the enlarged diameter portion 44. Consequently, the lower portion of the enlarged diameter portion 44 as viewed in FIG. 2 extends forwardly beyond electrodes 40 in the form of a lip 47, whereas the upper portion of the enlarged diameter portion 44 terminates rearwardly of the electrodes 40. A grounding electrode 48 extends radially from the outer surface of lip 47.

Flat surfaces 40 of electrodes 40 are oriented in the diagonal plane of oval surface 46. Moreover, the forward end of the catheter tip is provided with a tubular electrode encircling shield 50 which extends forwardly in an integral manner from sheath 28 and has a forward opening 52 and a rearward opening 54. Openings 52 and 54 are connected by a flow passageway 56 so that fluid enters forward opening 52 and passes through passageway 56 to exit via rearmost opening 54. It should be noted that surfaces 42 of electrodes 40 blend smoothly with the forward end of core 36 to provide a flow deflecting surface which directs the liquid upwardly and outwardly through openings 54. The flow path of the liquid is such that the direction of movement includes a component perpendicular to the axis of coil 30 and substantially parallel to surfaces 42. The shape of core 34 is such that the extended lip portion causes a magnetic field to be created with a large concentration of magnetic flux extending in a direction substantially perpendicular to surfaces 42 and concentrated in the vicinity of the electrodes. Consequently, the outward flow of the liquid in a direction substantially parallel to surfaces 42 provides a maximum efficiency in creating a voltage across electrodes 40 since the flow is largely perpendicular to the electromagnetic field. Therefore, the combination of a flow deflecting surface and electrodes mounted in the hollow core as shown in FIG. 2 provides an extremely efficient combination for achieving optimum output signals strength. Moreover, the shield 50 confines the electric field seen by the electrodes to the region inside the shield eliminating the motion artifacts common to most other electromagnetic flow probes.

Consequently, the noise level of the device of this invention is considerably less than the noise level of current widely used commercial catheter tip flowmeters.

In use, the device is inserted in a vein or artery so that flow enters opening 52 and exits via opening 54. The cutting of the electromagnetic flux by the fluid flowing past surfaces 42 of electrodes 40 creates an electromotive force across the electrodes which is conveyed to the read-out equipment by means of lines 38.

Obtainment of a zero base line indicative of a no-flow condition is easily enabled by moving the forward end of shield 50 against a portion of the environmental space in which the device is being used so as to prevent flow from entering the forward opening 52. For example, when using the device for measuring flow in the aorta, the forward end of shield 50 could be moved against the aortic valve leaflet to obtain a zero-flow condition. Also, in some instances, an outer hollow tubular catheter could be provided in a coaxial encircling arrangement with respect to the catheter tip assembly illustrated in the drawings so that the catheter tip assembly could be moved axially within the outer catheter member to enable the outer catheter member to block the rearmost opening 54. The use of such an outer catheter member would also enable the obtainment of a pressure reading if desired. Such an outer catheter would have an inside diameter slightly greater than the outside diameter of sheath 28 so as to enable movement of the catheter axially within the confines of the outer catheter without any undue effort. The outer catheter could be used to block the exit 54 of the flow passageway to obtain a zero-flow reading.

While only a preferred embodiment of this invention has been disclosed and discussed, it should be understood that other variations will occur to those skilled in the art and that this invention is limited solely by the appended claims.

I claim:

1. An elongated liquid flow sensing catheter tip having a forward end for insertion in blood vessels or the like, said catheter tip extending forwardly from a catheter and including an electromagnetic coil having a radial extent defining generally cylindrical configuration and having an axis oriented parallel to the axis of the catheter tip for creating a magnetic field, flow directing means for directing fluid past first and second electrodes in a direction having a substantial directional component perpendicular to said electromagnetic field, said first and second electrodes being positioned forwardly of the electromagnetic coil in said magnetic field inside the radial extent of said coil for detecting voltage variations in the fluid caused by movement of the fluid through said magnetic field created by said electromagnetic coil and conductor means connected to said electrodes to enable the provision of voltage signals to signal readout means.

2. The invention of claim 1 additionally including a hollow tubular electrode shield member extending forwardly of said electromagnetic coil and having a forward opening and a rearward opening and a fluid passageway extending between said forward and rearward openings so that liquid enters the forward opening to pass through said fluid passageway and exit through said rearward opening.

3. The invention of claim 2 wherein said flow directing means is adjacent the rearward end of said passageway and includes a flow deflecting surface inclined with respect to the axis of the electromagnetic coil forwardly of the forward end of the coil for directing fluid flowing past said surface in a direction having a component perpendicular to the axis of said electromagnetic coil.

4. The invention of claim 3 wherein said electrodes are mounted in said flow deflecting surface.

5. The invention of claim 4 additionally including a magnetic core extending through said coil forwardly adjacent to said electrodes and having a frontal termination forwardly of said electrodes.

6. The invention of claim 5 wherein said magnetic core is of hollow tubular construction and has an enlarged diameter forward portion terminating substantially adjacent said flow deflecting surface.

7. The invention of claim 6 wherein said first and second electrodes are located within the interior of said enlarged diameter forward portion.

8. The invention of claim 1 additionally including a magnetic core extending through said coil and having a forward surface termination which is partially forward of said first and second electrodes.

9. The invention of claim 8 wherein said forward surface termination lies in a plane slanted with respect to the axis of said core and is of substantially oval shape and wherein said first and second electrodes lie within said oval shaped termination and wherein said electrodes include flat exposed surfaces forming a portion of said flow directing means which is coextensive with said slanted plane with said flow directing surface serving to deflect fluid flowing past said directing surface in a direction having a component normal to the axis of said coil.

10. The invention of claim 9 additionally including a hollow tubular electrode shield member extending forwardly of and enclosing said flow deflecting surface with said shield member having a forward opening and a rearward opening and a fluid passageway extending between said forward and rearward openings so that liquid enters the forward opening and passes through said passageway to exit through said rearward opening.

11. The invention of claim 10 wherein said rearward opening is adjacent the rearward termination of said flow directing surface.

12. The invention of claim 2, wherein said hollow tubular electrode shield member is limited solely to a construction having a single forward opening so that a zero-flow condition is obtainable by moving said forward opening against any environmental surface for preventing flow from entering said forward opening.

13. The invention of claim 5 wherein said forward surface termination lies in a plane slanted with respect to the axis of said core and is of substantially oval shape and wherein said first and second electrodes lie within said oval shaped termination and wherein said electrodes include flat exposed surfaces forming a portion of said flow directing surface which is coextensive with said slanted plane with said flow directing surface serving to deflect fluid flowing past said directing surface in a direction having a component normal to the axis of said coil.

14. A catheter mounted liquid flow sensing catheter tip having a forward end for insertion in blood vessels or the like, said catheter tip including an electromagnetic coil wound about an axis parallel to the axis of the catheter tip, first and second spaced electrodes positioned forwardly of said electromagnetic coil for detecting voltage variations in a surrounding fluid caused by movement of the fluid through the magnetic field of the electromagnetic coil and a magnetic core having a rearmost end and a forward end extending through said coil with first and second electrode lead wires extending through said magnetic core from the rearmost end of said core along substantially the entire length of said core for connection to said first and second electrodes respectively with said lead wires being connectable to readout means to provide voltage signals to said readout means.

15. The invention of claim 14, wherein said magentic core member is of a hollow tubular construction providing an interior passageway through which said electrode lead wires extend.

16 The invention of claim 15 wherein said interior passageway through which said electrode lead wires extend is filled with plastic material.